(12) United States Patent
Kobres

(10) Patent No.: US 9,033,227 B2
(45) Date of Patent: May 19, 2015

(54) METHODS AND SYSTEMS FOR PERFORMING SECURITY WEIGHT CHECKS AT CHECKOUTS

(71) Applicant: Erick Christian Kobres, Lawrenceville, GA (US)

(72) Inventor: Erick Christian Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 24 days.

(21) Appl. No.: 13/897,550

(22) Filed: May 20, 2013

(65) Prior Publication Data

US 2014/0338987 A1    Nov. 20, 2014

(51) Int. Cl.
| | |
|---|---|
| G01G 19/414 | (2006.01) |
| G07G 1/14 | (2006.01) |
| A47F 9/04 | (2006.01) |
| G06K 15/00 | (2006.01) |
| G07G 3/00 | (2006.01) |
| G01G 23/01 | (2006.01) |
| G07G 1/00 | (2006.01) |
| G06Q 20/20 | (2012.01) |

(52) U.S. Cl.
CPC .............. *G01G 23/01* (2013.01); *G07G 1/0072* (2013.01); *G01G 19/4144* (2013.01); *A47F 9/04* (2013.01); *G06Q 20/208* (2013.01); *G07G 3/003* (2013.01)

(58) Field of Classification Search
CPC ... G06Q 20/208; G07G 1/0072; G07G 3/003; G01G 19/4144; G01G 23/01; A47F 9/04; A47F 9/047; A47F 9/048

USPC ........................................ 177/25.15; 235/383
See application file for complete search history.

(56) References Cited

U.S. PATENT DOCUMENTS

| | | | |
|---|---|---|---|
| 3,565,195 A * | 2/1971 | Miller et al. ............. | 177/21 OR |
| 3,836,755 A * | 9/1974 | Ehrat ............................ | 235/383 |
| 3,895,421 A * | 7/1975 | Miller .......................... | 29/25.42 |
| 4,779,706 A | 10/1988 | Mergenthaler | |
| 4,787,467 A * | 11/1988 | Johnson ........................ | 177/50 |
| 5,488,202 A * | 1/1996 | Baitz et al. .................. | 177/25.15 |
| 5,952,642 A * | 9/1999 | Lutz ............................. | 235/383 |
| 6,286,758 B1 | 9/2001 | Dejaeger et al. | |
| 6,694,201 B1 * | 2/2004 | Lee et al. ........................ | 700/96 |
| 6,712,268 B1 | 3/2004 | Mason et al. | |
| 6,886,746 B1 | 5/2005 | Edwards | |
| 7,016,862 B1 | 3/2006 | Vassigh et al. | |
| 7,118,990 B1 * | 10/2006 | Xu et al. ........................ | 438/455 |
| 7,416,117 B1 * | 8/2008 | Morrison ...................... | 235/383 |
| 7,466,231 B1 | 12/2008 | Seevers | |
| 7,533,799 B2 | 5/2009 | Edwards | |
| 7,575,162 B1 | 8/2009 | Malchak et al. | |
| 7,620,568 B1 | 11/2009 | Parker-Malchak | |
| 7,673,796 B2 | 3/2010 | Kobres et al. | |
| 7,673,797 B2 | 3/2010 | Edwards | |
| 2005/0189412 A1 * | 9/2005 | Hudnut et al. ................. | 235/383 |
| 2007/0175988 A1 * | 8/2007 | Martin ........................... | 235/383 |
| 2008/0226129 A1 * | 9/2008 | Kundu et al. ................. | 382/103 |
| 2008/0230603 A1 * | 9/2008 | Stawar et al. ................. | 235/383 |
| 2008/0237339 A1 * | 10/2008 | Stawar et al. ................. | 235/383 |
| 2013/0232021 A1 * | 9/2013 | Hagglund ....................... | 705/23 |

* cited by examiner

*Primary Examiner* — Randy W Gibson

(74) *Attorney, Agent, or Firm* — Peter H. Priest; Joseph P. Mehrle

(57) ABSTRACT

Checkout techniques are described to address fraud reduction and prevention. As an example, a bypass fraud detection process determines when a customer may have attempted to bypass self-checkout security.

12 Claims, 4 Drawing Sheets

METHODS AND SYSTEMS FOR PERFORMING SECURITY WEIGHT CHECKS AT CHECKOUTS

FIELD OF THE INVENTION

The present invention relates generally to improved methods and apparatus for checkout, and more particularly, to advantageous techniques for addressing practices such as "bypassing" in the self-checkout context in which a shoplifter removes an item or items from a cart or basket and then bags the item near the self-checkout security scale without scanning and bagging the item on the security scale. To address such problems, in the self-checkout context, the present invention weighs the entire cart or basket before the transaction starts, deducts a tare to determine the total weight of the contents, and detects when the total weight measured by the security scale does not correspond with the weight of the contents.

BACKGROUND OF THE INVENTION

Retail items are sold in a variety of different ways. For example, a barcode on an item to be sold is scanned by a barcode scanner and the price is looked up in a price look-up (PLU) table. A point of sale (POS) terminal builds up a list of items and prices as items are scanned and a total price and itemized receipt are generated in a known manner. Other items are sold by weight, quantity, length or the like.

As an example of items sold by weight, item price information is commonly embedded in barcodes for applications such as deli products, such as meat, cheese and the like. Alternately, the weight of an item is sometimes embedded within the item barcode for purposes of price determination. For example, red delicious apples may be $1.59 a pound and a barcode may indicate that a bag is 5 pounds so that the ultimate price is determined by multiplying 5 pounds×$1.59/pound.

A wide variety of self-checkout apparatus and solutions have been proposed and adopted over the past decade or so. See, for example, U.S. Pat. Nos. 4,779,706; 6,286,758; 6,886,746; 7,016,862; 7,466,231; 7,533,799; 7,575,162; 7,620,568; 7,673,796; and 7,673,797, all of which are assigned to the assignee of the present invention and incorporated by reference herein in their entirety. Such approaches often include some efforts to utilize weight information to enhance the security process.

Weight checks may be employed in a variety of contexts as security checks and to prevent fraud. As one example, in a service aided checkout environment, a weight of an item may be checked to prevent a service person assisted fraud where one item is scanned and another more expensive item is bagged, a customer swapping one bar code label removed from a less expensive item for another from a more expensive item, a customer substituting a customer generated bar code, or the like. Additionally, items in the child seat area of a cart or on the bottom shelf may fail to be scanned as an oversight or otherwise.

In self-checkout, one typical self-service terminal includes security systems that monitor the operation of the terminal and the activities of the customer. For example, a security weight scale or weight scales are incorporated into the terminal to monitor the total weight of the items brought by the customer to the terminal or the total weight of the items placed in a grocery cart or shopping basket. In such security systems, a software routine is executed by a computer or processor associated with the terminal that analyzes the signal output from the security weight scale, as well as, other user-interfaces of the terminal. One typical software routine compares the weight of each item as it is scanned with a database of expected weight values. Any discrepancy results in the generation of an error message and a pause in the checkout routine until the customer or store personnel takes appropriate corrective action, such as re-scanning the merchandise. A weight error signal may result in intervention by store personnel to clear up the problem.

In one weight verification routine, weight signals from a security scale are verified against a weight for each scanned product where the mean weight $M_n$ of each product or item 1 through item n available in the store is stored in a database along with a weight standard deviation $SD_n$ for each item. As an item is scanned by the scanner and placed on a scale, the weight measured at the scale is compared to a weight range calculated from the mean and standard deviation data extracted from the database for that item. If the weight falls within a calculated range $M_n \pm$ the standard deviation $SD_n$ (optionally multiplied by an arbitrary constant A), the entry is accepted. If the weight falls outside this range, the entry is rejected. In the self-checkout context, the customer is instructed to re-scan and/or re-weigh the item. In addition, in some terminals, a weight error is communicated to a store attendant as part of the terminal security measures. The routine continuously updates the mean weight and standard deviation values for each item with each new accepted observation of the weight of that item.

As further described in U.S. Pat. Nos. 7,620,568 and 6,712,268 assigned to the assignee of the present application, and incorporated by reference herein in their entirety, a memory containing a weight learning database (WLDB) may be suitably employed. The WLDB contains a predetermined weight for items to be weighed and can learn the weights of each item from a series of weighings of the item. Commonly such learning systems are unable to apply security the first few times a new item is sold because the characteristic weight and variance have not been determined. When the inventory count of items is large and re-occurring week to week, the inability to provide weight characteristic checking for the first few times the item is sold is not significant.

However, where the weight data is tied to scanning and bagging the item, the person intent on fraud can simply take an item from a cart or basket, and not weigh the item as in bypass fraud. As a result, if a camera or store employee does not witness the deception, the security scale will be defeated.

SUMMARY OF THE INVENTION

Among its several aspects, the present invention recognizes that in several contexts an improved method of checkout employs a weight scale to weigh a customer's cart or basket with its contents including the items to be purchased at the start of checkout. The self-checkout system will record the overall weight of the shopping cart or basket and contents, using the weight of the cart or basket as a tare value to obtain an aggregate weight of the contents. This weight of the contents serves as the expected weight for the self-checkout transaction. If less weight is bagged as detected by the security scale over the course of the transaction, an intervention is raised and the cashier performs an audit of the transaction. Exceptions for personal items, such as a purse, umbrella, or clip board left in the cart or basket can be simply addressed by allowing the cashier or operator to weigh these items to see if this weight balances out.

Additionally, as each item is removed, a weight difference representing the weight of the item may be calculated. This weight can then be utilized as addressed in greater detail below to make sure that a specific item does not bypass the checkout process. Additionally, the weight can be used to supplement a weight database, such as a weight learning database, or to detect a possibly damaged product where the weight does not conform to a weight from a weight database, or to trigger or timestamp a video record of the transaction for further store review. Additionally, at the end of the checkout process, the measured weight should be within a predetermined weight of the known weight of the cart or basket, or a tare weight. If not, an alert can be triggered so that the customer or store personnel can determine whether a customer's purse is still in the cart, an item is on the bottom shelf or remains in the basket, or the like.

Among its several aspects, the present invention allows checkout and self-checkout weight based item security to be more effectively and efficiently utilized. In one embodiment, a method is provided for performing a checkout security test by measuring weight for a plurality of items plus a tare utilizing a first weigh scale, detecting if a change in the weight measured by the first weigh scale at a first time, determining if a timely scan of an item has occurred, and generating an indication of a potential fraud if it is determined that a timely scan of an item has not occurred.

According to another aspect, a system for performing a checkout security test comprises a scale measuring weight for a plurality of items plus a tare, a programmed processor detecting a change in the weight measured by the first weigh scale at a first time, the programmed processor also determining if a timely scan of an item has occurred, and the system generating an indication of a potential fraud if it is determined that a timely scan of an item has not occurred A more complete understanding of the present invention, as well as further features and advantages of the invention, will be apparent from the following Detailed Description and the accompanying drawings.

DETAILED DESCRIPTION

As discussed above, a traditional self-checkout system may use an item weight based security system where the measured weight of each purchased item that is scanned and bagged is compared against a library or database of allowable weights for that item. The allowable weight is often learned over repeated observations of the item, possibly at a checkout station, the store level or optionally across stores. This approach may be defeated if the scanning and bagging process is bypassed. Conversely, in checkout with a store checkout person, there are typically no security scales employed and only items such as produce and the like are regularly weighed. Among its several aspects, the present invention allows several self-service security techniques to be leveraged in the aided checkout arena.

Figure 1:
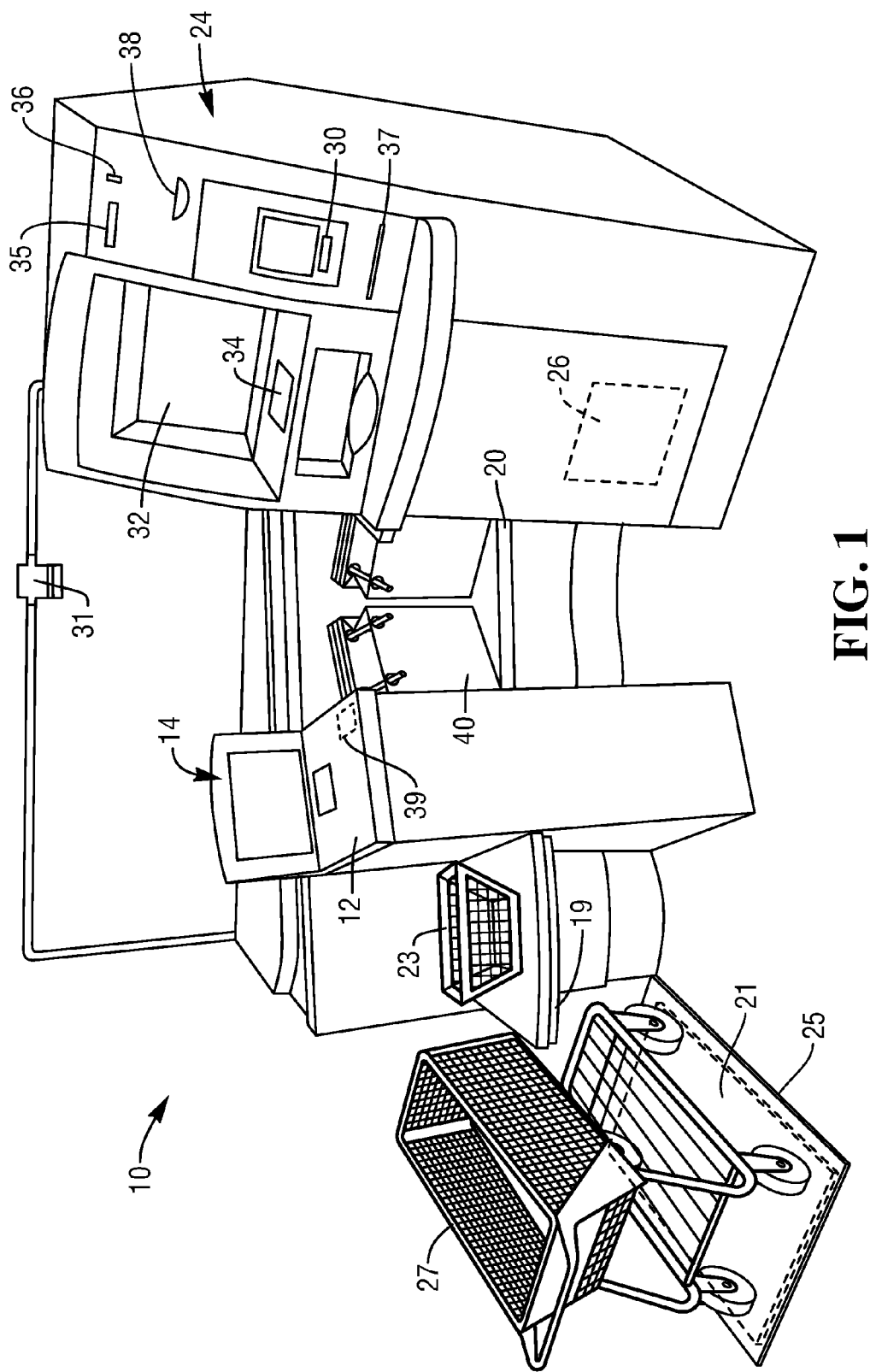
FIG. 1 is a perspective view of a self-checkout system modified in accordance with the present invention to determine an aggregate pre-beginning of checkout weight in accordance with the present invention.

Turning to the drawings, FIG. 1 shows a self-checkout terminal 10 that may be suitably used in a supermarket or retail setting. The terminal 10 includes a product weight scale 12, such as a produce scale, and a scanner 14 for scanning bar codes and the like associated with the scale. A bagging or security scale 20 is provided adjacent the scanner 14 to support shopping bags into which the customer places each newly scanned item. As items are added to bags 40 and weighed by the security scale 20, their weights are checked to see if they conform to those from a weight database, as measured by scale 12, or as measured by scales 19 or 21.

The terminal 10 also includes a basket scale 19 configured to support and weigh a shopping basket 23 full of products and a shopping cart scale 21 incorporated into a floor mat 25 arrayed on the store floor adjacent the terminal 10. Scale 21 is configured to support and weigh a shopping cart 27 full of products or items and to produce an aggregate weight for the cart 27 and everything in it. At the beginning of self-checkout, the customer may be prompted to place his or her basket 23 or cart 27 on the appropriate scale 19 or 21, respectively, and then to begin scanning items one at a time. Such prompts may be provided on a display screen or display 32, an audio file prompt, or a combination of both. Each of the scales 12, 19, 20 and 21 includes at least one weight detector, such as a pressure sensor, a load cell sensor, a piezoelectric weight sensor, or the like, which is operable to generate a signal in response to the weight of the item placed on the scale. The terminal 10 processes such signals as addressed further below. Examples of presently preferred cart and basket weight sensors include the large dimension, flexible piezoelectric tapes of U.S. Pat. Nos. 6,694,201 and 7,118,990 which are incorporated by reference herein in their entirety, and which can be readily incorporated into a low profile and effective floor mat arrangement or the like.

Figure 2:
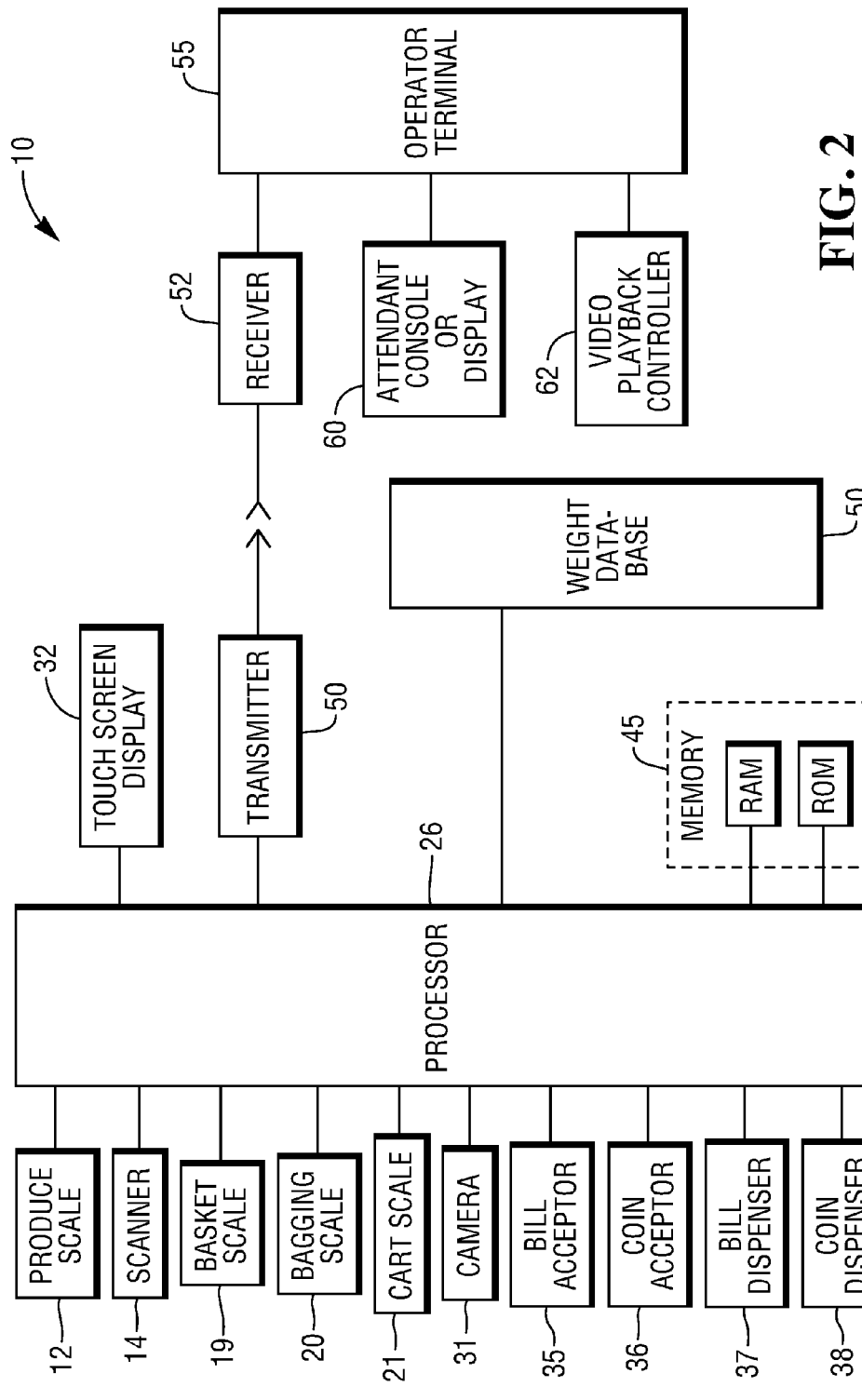
FIG. 2 is a block diagram of a control circuit for the self-checkout system of FIG. 1.

A kiosk 24 includes the display 32, data input device 34 and a payment device 30, as well as, a bill acceptor 35, coin acceptor 36, bill dispenser 37 and coin dispenser 38. An RFID tag reader 39 is incorporated within scale 12. A camera or cameras represented by camera 31 may be employed to take video of the self-checkout process. A computer or processor 26 is resident within the terminal 10 and executes various software routines associated with the self-checkout process. In particular, processor 26 executes software implementing processes, such as the processes of FIGS. 3 and 4, for example, as discussed further below in connection with FIG. 2.

The present invention adds new intelligence to the self-checkout application software making it capable of operating in conjunction with the basket and cart scales 19 and 21, respectively, and in conjunction with the security systems as described further below. As seen in the block diagram of FIG. 2 which shows illustrative components relative to preventing "bypassing" and the like, processor 26 receives inputs from scale 12, scanner 14, basket scale 19, bagging scale 20, cart scale 21, camera 31, bill acceptor 35, coin acceptor 36, bill dispenser 37, coin dispenser 38, RFID reader 39, and weight database 50. The processor 26 provides outputs to drive touch screen display 32. It has non-transitory software memory 45 storing software which when executed controls the processor 26 to perform the methods and processes described further herein. It also wirelessly or otherwise transmits an output to a receiver 52 of an operator terminal 55 which when received by terminal 55 causes that terminal to drive operator console or display 60 to alert an operator to potential problems. A video playback controller 62 receives video and a timestamp or trigger output from processor 26 which is utilized to control display 60 to efficiently allow an operator to focus on a probable or possible fraud circumstance as addressed further below. It will be recognized that alternatively or additionally an audio notification can be employed and a red or other light can light at self-checkout terminal 10 to further guide the attendant to the problem. Operator terminal 55 and console 60 are remote from the self-checkout terminal 10. In a typical store arrangement, a group of terminals 10 is overseen by a single attendant from an attendant station.

Figure 3:
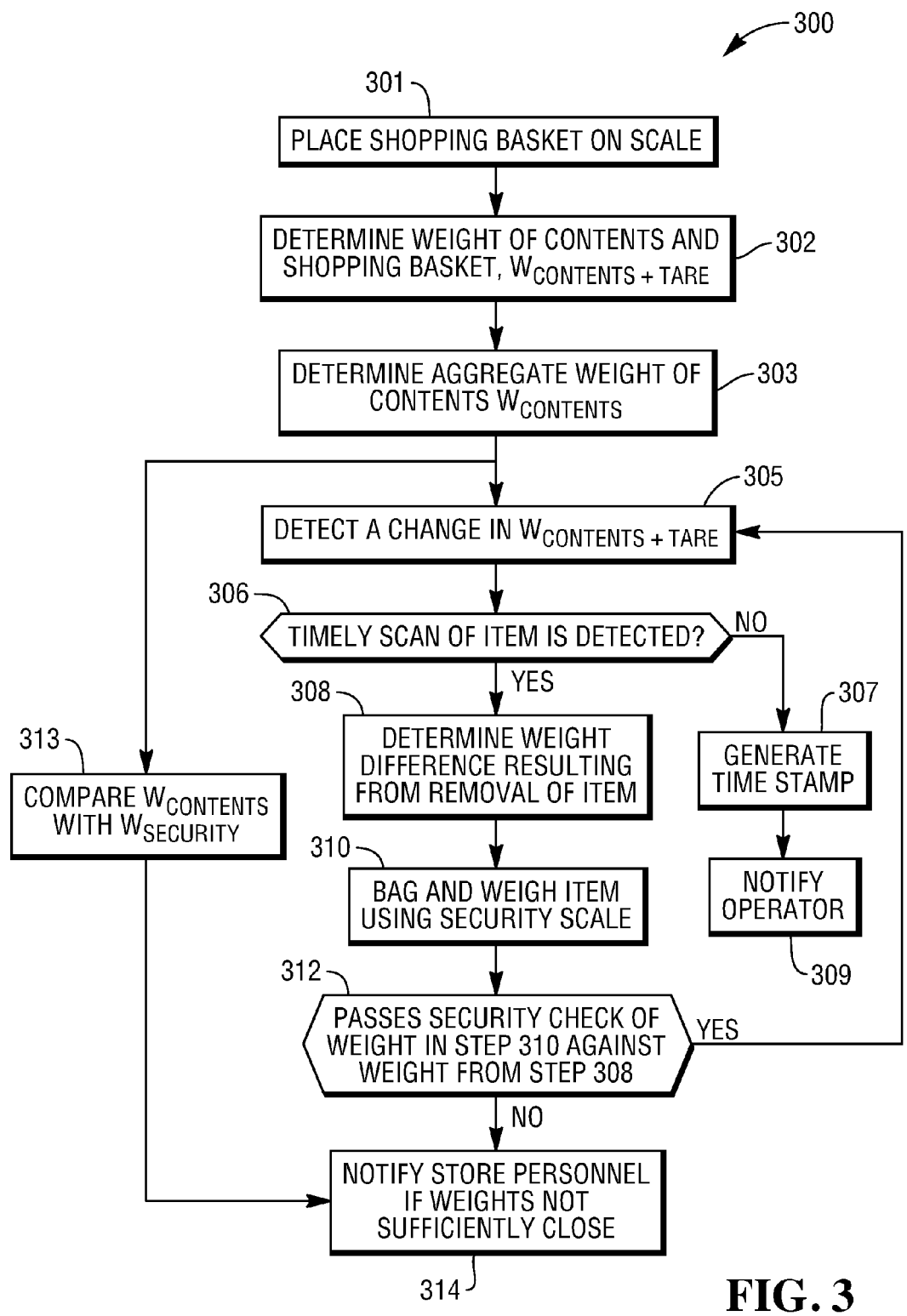
FIG. 3 shows a first process in accordance with the present invention for reducing fraud during self-checkout.
Figure 4:
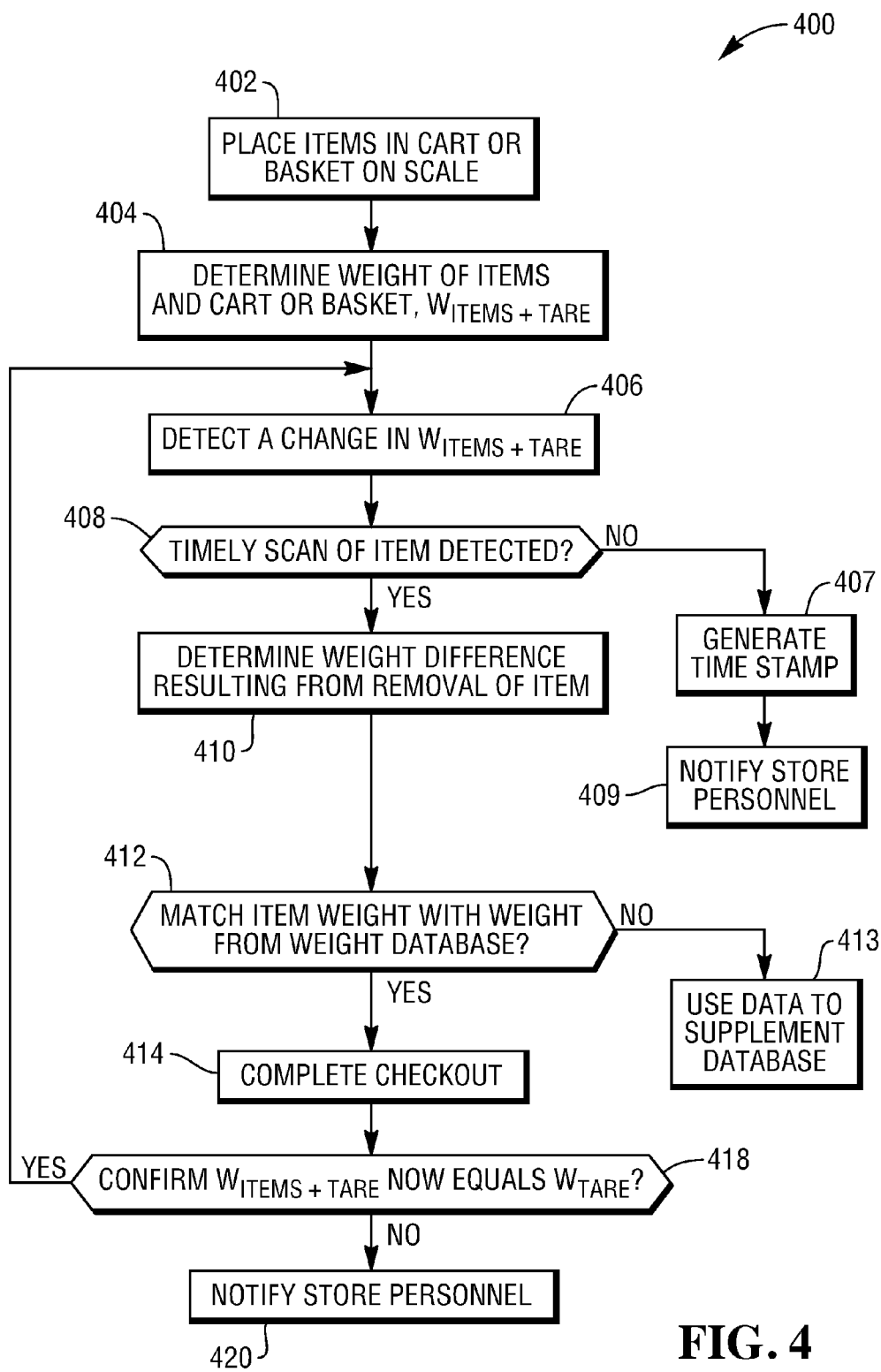
FIG. 4 shows a second process in accordance with the present invention for improved checkout.

Turning to FIGS. 3 and 4, these figures illustrate example security processes 300 and 400, respectively, in accordance with embodiments of the present invention. In process 300, a customer places a basket 23 with its contents on basket scale 19, or a cart 27 with its contents, is placed on cart scale 21 in step 301. While these contents will predominantly comprise items to be checked, they may also include personal items, such as an umbrella, a purse, or the like. Both the basket 23 and cart 27 or the like will be collectively referred to herein as a shopping basket.

Optionally, a display, such as display 32 may instruct the customer to begin checkout by placing the shopping basket on the appropriate scale with a video or illustration of same on the display 32. In step 302, the weight of the shopping basket and contents is determined, $W_{CONTENTS+TARE}$, for example, by processor 26 from weigh signals from scale 19 or scale 21, respectively. In step 303, the weight of the shopping basket is subtracted to obtain the aggregate weight of the contents, $W_{CONTENTS}$. This aggregate weight is compared with the total weight weighed by the security scale at the end of the transaction, $W_{SECURITY}$, in step 313 and store personnel is notified to intervene if the comparison is not sufficiently close.

Additionally, in step 305, a change in $W_{CONTENTS+TARE}$ may be detected. For example, a customer removes a first item from the cart 27 or a fraudster removes a first item as part of a bypass fraud attempt. When the first item is presented for scanning, scanning of the first item is detected in step 306. In addition, in step 306, it is determined whether the scan of the first item is detected within a predetermined time of detecting a change in $W_{CONTENTS+TARE}$ and before a further detected change in $W_{CONTENTS+TARE}$. If no, then, in step 307, a camera time stamp signal 307 is generated by processor 26 and in step 309, the operator is notified of possible bypass fraud. This time stamp signal is provided to operator terminal 55 and may be advantageously used to index video from self-checkout terminal 10 where a possible bypass fraud is being investigated. The operator may select the video for terminal 10 and review it from the time stamp to watch what the customer did, simplifying and speeding up the security process.

In normal operation, a customer scans a first item, such as a can of soda, at a self-checkout terminal, such as terminal 10. A barcode or other price label is read by a scanner, such as scanner 14 to provide item or item category identification information. In this event, the timely scan of the first item is detected in step 306. Alternatively, or in addition, an RFID tag may be read using RFID tag reader 39. Optionally, the customer may be prompted to scan a first item and reminded to remove one item at a time from the basket or cart.

After, the timely scan, in step 308, the weight of the basket and items or cart and items after removal of the can of soda is determined and the difference from the weight at step 302 is determined and may be utilized in conjunction with the security scale to confirm the first item is properly bagged as addressed below.

To this end, upon successful scanning of the can of soda, the display 32 may instruct the customer to bag the first item in one of the bags 40 over security scale 20 which weighs the bagged item in step 310. An audio prompt to bag the first item ay also be provided in a known fashion.

Alternatively or in addition, it may be determined whether an item weight for the scanned item is in a weight database, such as the weight database 50, for example.

In step 312, it is determined if a security check is passed. For example, the specific item's weight, such as 12 ounces for the can of soda, is used for a security check against the weight determined in step 308, and against the weight measured by security scale 20 when the customer bags the item in bag 40, for example. If the customer does not bag an item having a weight measured by the security scale 20 sufficiently close in weight to the weight measured in step 306, in step 314, store personnel may be notified to look into the situation. For example, display 60 at operator terminal 55 may display the identifier for a particular self-checkout terminal 10 where a potential fraud may have occurred.

In step 312, the security check is passed, the process loops back to step 305 as the customer removes a next item to be scanned and another change in $W_{CONTENTS+TARE}$ is detected. The process continues until the customer has scanned and bagged all the items.

Process 400 of FIG. 4 begins with step 402 in which a customer wheels a cart of items such as cart 27 onto a weigh scale 21 or places a basket of items onto a basket scale 19 adjacent an operator assisted checkout station. It will be recognized that while a terminal 10 may be operated in a self-checkout mode, it may also be operated in an assisted mode where store personnel assists the customer in checking out. Additionally, a mat based weigh scale like scale 21 may be suitably placed adjacent a standard operated assisted checkout lane like those common in grocery and retail stores. Where the scales 19 and 21 are accurate enough, the weight signals therefrom can be utilized to add weight data for an item or items, such as a bouquet of fresh flowers, not already in a weight database such as weight database 50. The weight data can also be employed to detect items on the bottom shelf of a cart 27, customer property left in the child seat portion or the like, as addressed further below.

While the present invention has been disclosed in the context of various aspects of presently preferred embodiments, it will be recognized that the invention may be suitably applied to other store environments consistent with the claims which follow and subsequent advances in the field. For example, while the bulk of the discussion above is in the context of self-checkout, it will be recognized that the concepts can be applied to check out systems more generally. Particularly, the weigh mat scale can be readily moved from a self-checkout lane to a regular assisted checkout lane and adapting self-checkout security, such as video time stamping, to the checkout context.

In step 410, the weight of the basket and items or cart and items after removal of the can of soda is determined and the difference from the weight at step 404 is determined and may be utilized in conjunction with a weight from a weight database to confirm the first item has been properly checked out and matched with a weight from the weight database corresponding to the bar code identification in step 412. If yes, the process loops back to step 406 and a weight change is detected as a further item is removed from the cart. If no, the data may be used to supplement the weight database in step 413.

In step 414, it is determined if checkout is concluded from the vantage point of the operator.

In step 416, it is confirmed that $W_{ITEMS+TARE}$ now equals $W_{TARE}$. If not, something is still in the cart or basket and the operator or store personnel is notified in step 418.

Additionally, with this approach, a customer can be trusted to scan as a last item a large bag of dog food on the bottom shelf of the cart as confirmation can be had that the weight of the bag from the weight of the weight database matches the weight $W_{CONTENTS+TARE}$ less $W_{TARE}$, while the operator bags other items thereby speeding checkout.

While the present invention has been disclosed in the context of various aspects of presently preferred embodiments, it will be recognized that the invention may be suitably applied to other environments consistent with the claims which follow and subsequent advances in the field. For example, while the bulk of the discussion above is in the context of self-checkout, it will be recognized that the concepts can be applied to check out systems more generally where a security weight database is employed.

I claim:

1. A method for performing a self-checkout security test comprising:
    measuring an aggregate weight for a shopping cart and its contents utilizing a first weigh scale integrated into a mat on a floor where the shopping cart is located at a self-checkout system with the shopping cart on the mat;
    deducting a tare for the weight of the shopping cart to determine an aggregate weight for its contents;
    determining a security weight for all items actually scanned and bagged utilizing a security scale of the self-checkout system;
    comparing the aggregate weight for contents with the security weight; and
    notifying an operator if the comparison results in a difference more than a predetermined amount.

2. A method for performing a checkout security test comprising:
    measuring a weight for a plurality of items plus a tare utilizing a first weigh scale integrated into a mat on a floor where the shopping cart is located at a self-checkout system with the shopping cart on the mat;
    detecting a change in the weight measured by the first weigh scale at a first time;
    determining if a timely scan of an item has occurred with relationship to said detected change; and
    generating an indication of a potential fraud if it is determined that a timely scan of an item has not occurred.

3. The method of claim 2 where the step of determining if a timely scan of an item has occurred further comprises determining if a scan of an item has occurred within a predetermined time of said detecting a change in the weight.

4. The method of claim 3 wherein the step of determining if a timely scan of an item has occurred further comprises determining if a scan of an item has occurred prior to detecting a further change in the weight measured by the first weigh scale.

5. The method of claim 2 further comprising where the step of generating an indication of a potential fraud further comprises generating a timestamp associated with video of checkout.

6. The method of claim 2 wherein the tare comprises the weight of an empty shopping cart.

7. A system for performing a self-checkout security test comprising:
    a first weigh scale to measure a weight for a shopping cart and its contents, the first weigh scale integrated in to a mat on a floor where the shopping cart is located at a self-checkout system with the shopping cart on the mat;
    a programmed processor to deduct a tare for the weight of the shopping cart to determine a weight for its contents;
    a security scale of the self-checkout system to determine a security weight for all items actually scanned and bagged;
    a programmed processor to compare the weight for contents with the security weight; and a programmed processor to notify an operator terminal if the comparison differs by more than a predetermined amount.

8. A system for performing a checkout security test comprising:
    a scale measuring weight for a plurality of items plus a tare, wherein the scale is integrated into a mat on a floor and is located at a self-checkout system;
    a programmed processor detecting a change in the weight measured by the first weigh scale at a first time;
    the programmed processor also determining if a timely scan of an item has occurred; and
    the system generating an indication of a potential fraud if it is determined that a timely scan of an item has not occurred.

9. The system of claim 8 where the step of determining if a timely scan of an item has occurred further comprises determining if a scan of an item has occurred within a predetermined time of said detecting a change in the weight.

10. The system of claim 9 wherein the processor further determines if a timely scan of an item has occurred by determining if a scan of an item has occurred prior to detecting a further change in the weight measured by the first weigh scale.

11. The system of claim 10 further comprising the processor generating an indication of a potential fraud by generating a timestamp associated with video of checkout by a video controller.

12. The system of claim 8 wherein the tare comprises the weight of an empty shopping cart.

* * * * *